US006787964B2

United States Patent
Huang et al.

(10) Patent No.: US 6,787,964 B2
(45) Date of Patent: Sep. 7, 2004

(54) MINIATURE MOTOR STRUCTURE

(75) Inventors: Wen-Shi Huang, Taoyuan Hsien (TW);
Kuo-Cheng Lin, Taoyuan Hsien (TW);
Tsu-Liang Lin, Taoyuan Sien (TW);
Chu Hsien Chou, Taoyuan Hsien (TW)

(73) Assignee: Delta Electronics Inc., Taoyuan Sien (TW)

( * ) Notice: Subject to any disclaimer, the term of this patent is extended or adjusted under 35 U.S.C. 154(b) by 0 days.

(21) Appl. No.: 09/986,729

(22) Filed: Nov. 9, 2001

(65) Prior Publication Data

US 2002/0117932 A1 Aug. 29, 2002

(30) Foreign Application Priority Data

Feb. 27, 2001 (TW) ...................................... 90202945 U

(51) Int. Cl.⁷ ............................ H02K 37/14; H02K 1/12
(52) U.S. Cl. ................................. 310/257; 310/40 MM; 310/49 R; 310/164
(58) Field of Search ............................. 310/257, 67 R, 310/254, 194, 164, 40 MM, 49 R

(56) References Cited

U.S. PATENT DOCUMENTS

| | | | | |
|---|---|---|---|---|
| 3,383,534 A | * | 5/1968 | Ebbs | 310/257 |
| 4,656,381 A | * | 4/1987 | Komatsu | 310/257 |
| 4,899,075 A | * | 2/1990 | Hasebe | 310/257 |
| 5,945,765 A | * | 8/1999 | Chen | 310/257 |
| 6,166,470 A | * | 12/2000 | Miyazawa et al. | 310/181 |

FOREIGN PATENT DOCUMENTS

JP        11-275847        * 10/1999        .......... H02K/37/14

* cited by examiner

Primary Examiner—Burton Mullins
(74) Attorney, Agent, or Firm—Birch, Stewart, Kolasch & Birch, LLP

(57) ABSTRACT

A miniature motor structure includes a stator, a circular magnet and a shift. The stator further includes a first coil seat, a coil and a second coil seat. The first coil seat includes a first bottom plate having a first central opening, a plurality of first outer teeth and a plurality of first inner teeth. The coil is formed in the first coil seat. The second coil seat includes a second bottom plate having a second central opening, a plurality of second outer teeth and a plurality of second inner teeth. Each of the second outer teeth is interposed between the adjacent first outer teeth and each of the second inner teeth is interposed between the adjacent first inner teeth. The circular magnet surrounds the stator.

24 Claims, 8 Drawing Sheets

MINIATURE MOTOR STRUCTURE

BACKGROUND OF THE INVENTION

1. Field of the Invention

The present invention relates to a motor structure, and more particularly to a miniature motor structure.

2. Description of the Prior Art

As shown in FIG. 1, the stator structure of a conventional miniature motor includes an upper silicon steel 10, a bearing tube 20, a lower silicon steel 30 and a coil 40. Among these, the upper silicon steel 10 and the lower silicon steel 30 are annular in shape. Besides, there are upper side plates or lower side plates extending upward or downward from the outer periphery of the upper silicon steel 10 and the lower silicon steel 30. The cylindrical bearing tube 20 provides a rivet joint so as to joint the upper silicon steel 10, the coil 40 and the lower silicon steel 30 together. Further, the coil 40 is sandwiched between the upper silicon steel 10 and the lower silicon steel 30.

The disadvantage of the conventional miniature motor at least includes that the bearing tube 20 providing a rivet joint is required for jointing the upper silicon steel 10, the coil 40 and the lower silicon steel 30 together. That is, the conventional miniature motor is not easy to fabricate.

SUMMARY OF THE INVENTION

The present invention discloses a miniature motor structure omitting the prior bearing tube described above to reduce cost and simplify the required fabricating process.

The present miniature motor structure includes a first coil seat, second coil seat, a coil, a circular magnet, a metal housing and a shaft. The first coil seat includes a first bottom plate, a plurality of first outer teeth and a plurality of first inner teeth. The first bottom plate further includes a first central opening. The first outer teeth protrude from the first bottom plate and surround the outer periphery of the first bottom plate. The first inner teeth protrude from the first bottom plate and surround the first central opening. Further, the coil is positioned in the first coil seat.

The second coil seat includes a second bottom plate, a plurality of second outer teeth and a plurality of second inner teeth. The second bottom plate further includes a second central opening. The second outer teeth protrude from the second bottom plate and surround the outer periphery of the second bottom plate. The second inner teeth protrude from the second bottom plate and surround the second central opening.

The second bottom plate of the second coil seat is formed above the coil and the first coil seat. Besides, each of the second outer teeth is interposed between the adjacent first outer teeth. Each of the second inner teeth is interposed between the adjacent first inner teeth. In this manner, the first coil seat and the second coil seat define a space accommodating the coil. In addition, the first inner teeth and the second inner teeth form a post for winding the coil. By means of the first inner teeth and the second inner teeth, the first coil seat and the second coil seat are coupled to each other. In the preferred embodiment, both of the first coil seat and the second coil seat are made of silicon steel. However, other magnetic conduction material, such as nickel steel, is applicable to the first coil seat and the second coil seat. The coil may be a preformed coil. Alternatively, the coil may be the coil wound around the post.

The first coil seat, the second coil seat and the coil construct the stator of the present invention. The first coil seat and the second coil seat may be identical to each other. That is, the stator may be composed of a first coil seat, an upside-down first coil seat and a coil. However, the first coil seat may be different from the second coil seat. Besides, the first coil seat and the second coil seat are made of sheet metal.

In order to advantageously adjust the angle of magnetic inclination to start the motor, the outer teeth optionally includes a cut corner, an arc and a gap may extending from the outer teeth to the bottom plate.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 2(*b*) depicts the exploded view illustrating the stator and the rotor;

FIG. 2(*c*) depicts the combined view illustrating the stator and the rotor;

DESCRIPTION OF THE PREFERRED EMBODIMENT

Figure 3:
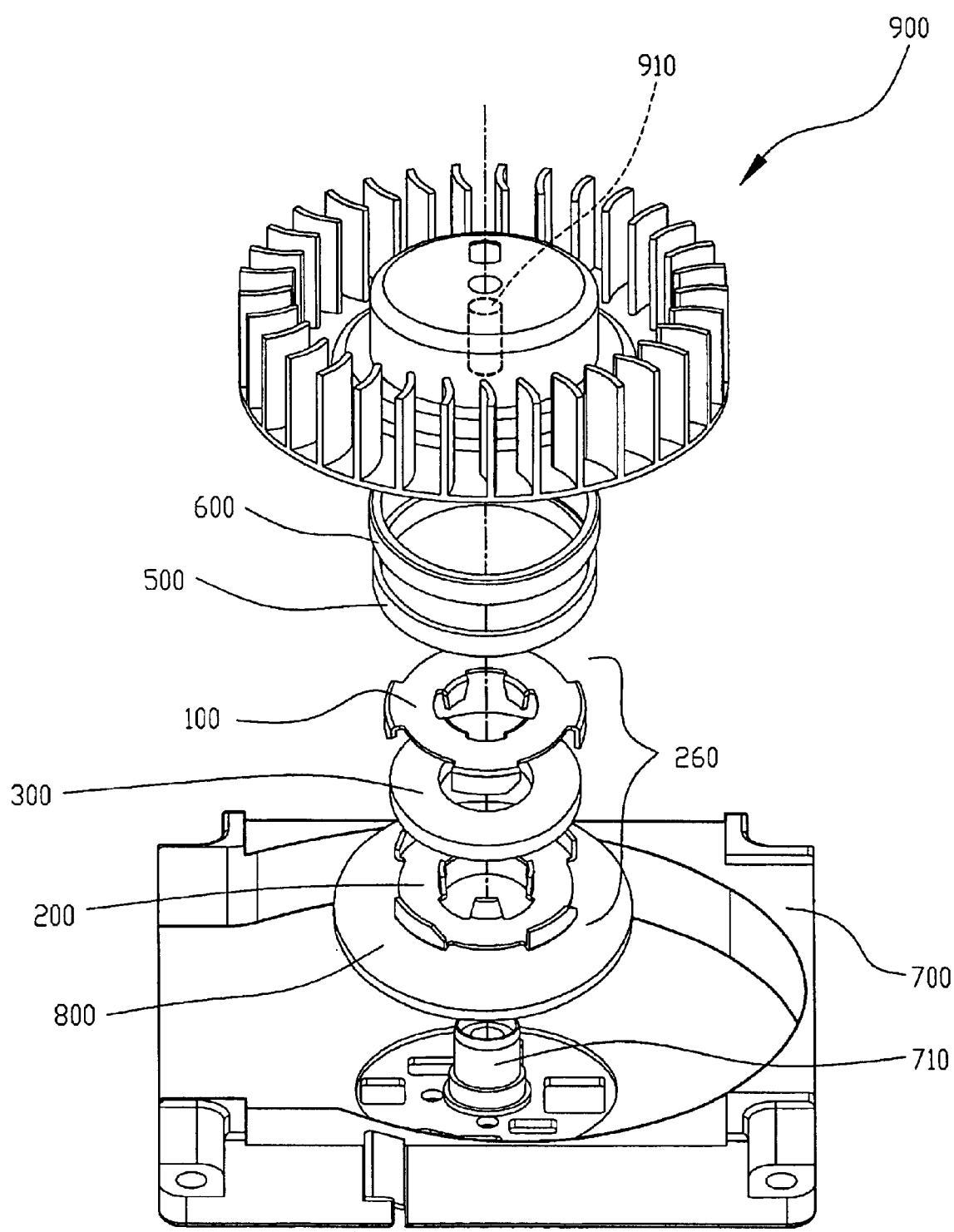
FIG. 3 depicts the exploded view illustrating the miniature motor according to the present invention.

The present invention discloses a miniature motor structure. As shown in FIG. 3, the present miniature motor structure includes a first coil seat 100, second coil seat 200, a coil 300, a circular magnet 500, a metal housing 600 and a shaft (not shown).

Figure 2A:
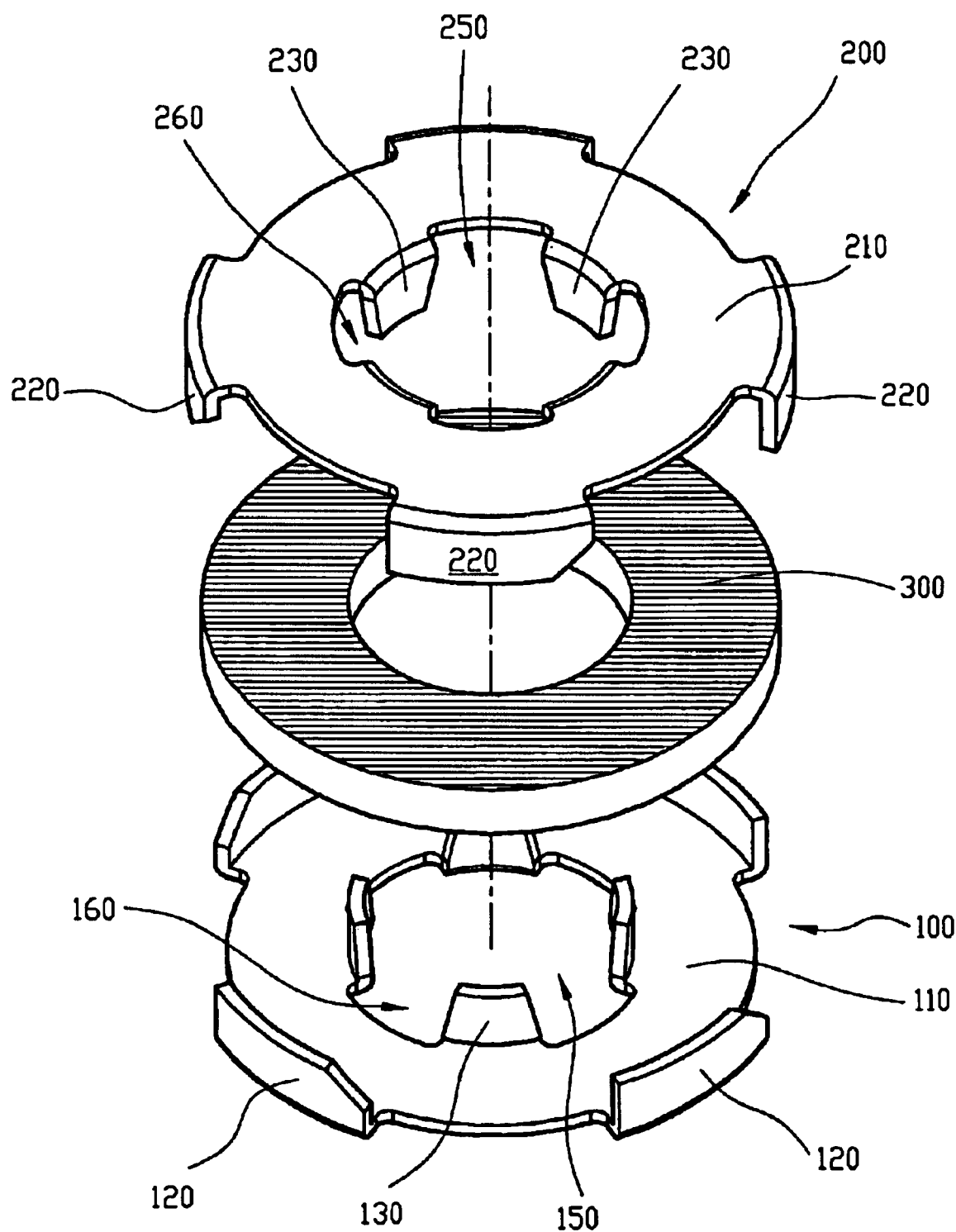
FIG. 2(*a*) depicts the exploded view illustrating the stator of the miniature motor according to the present invention.
Figure 2B:
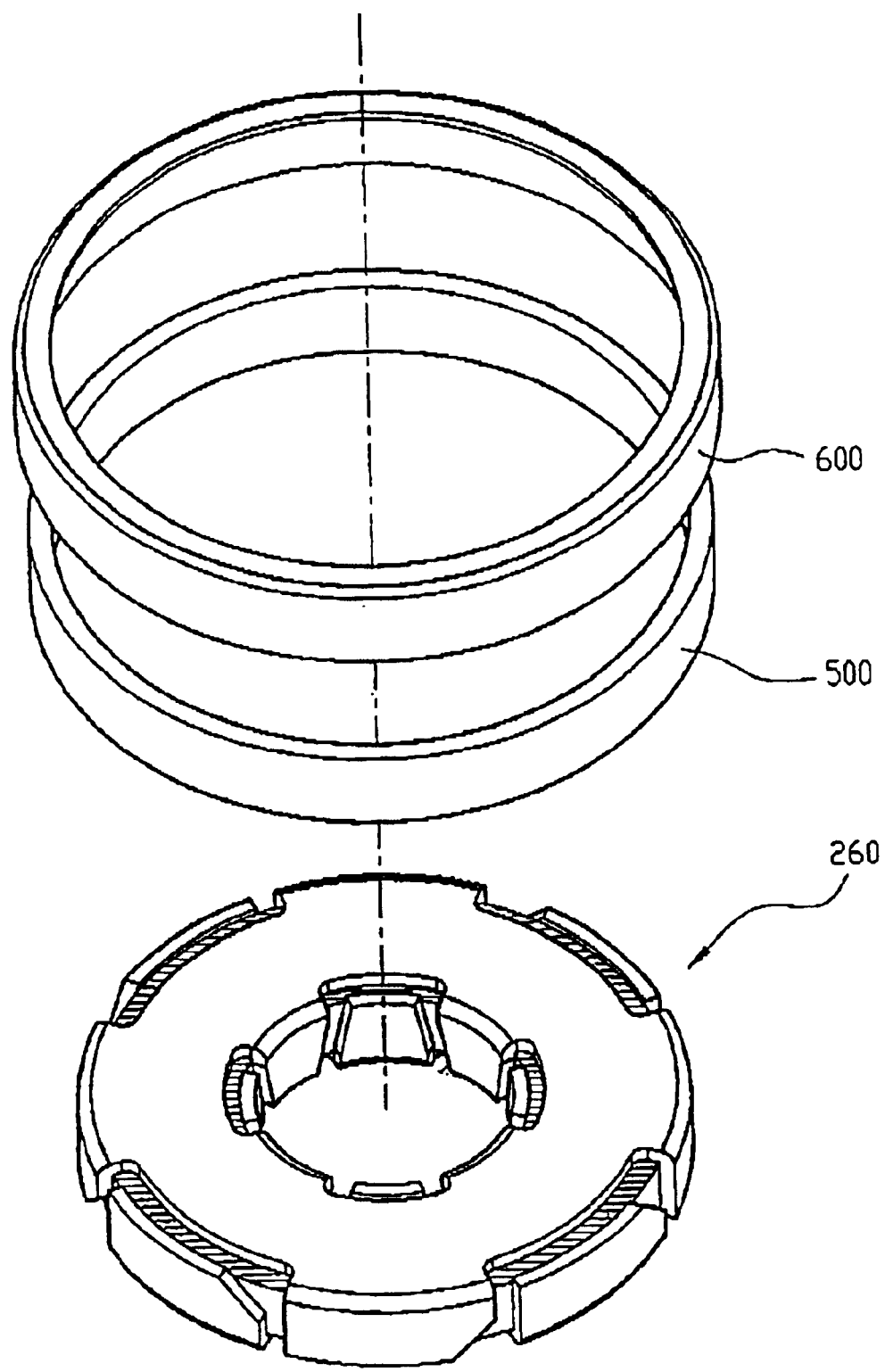
Figure 2C:
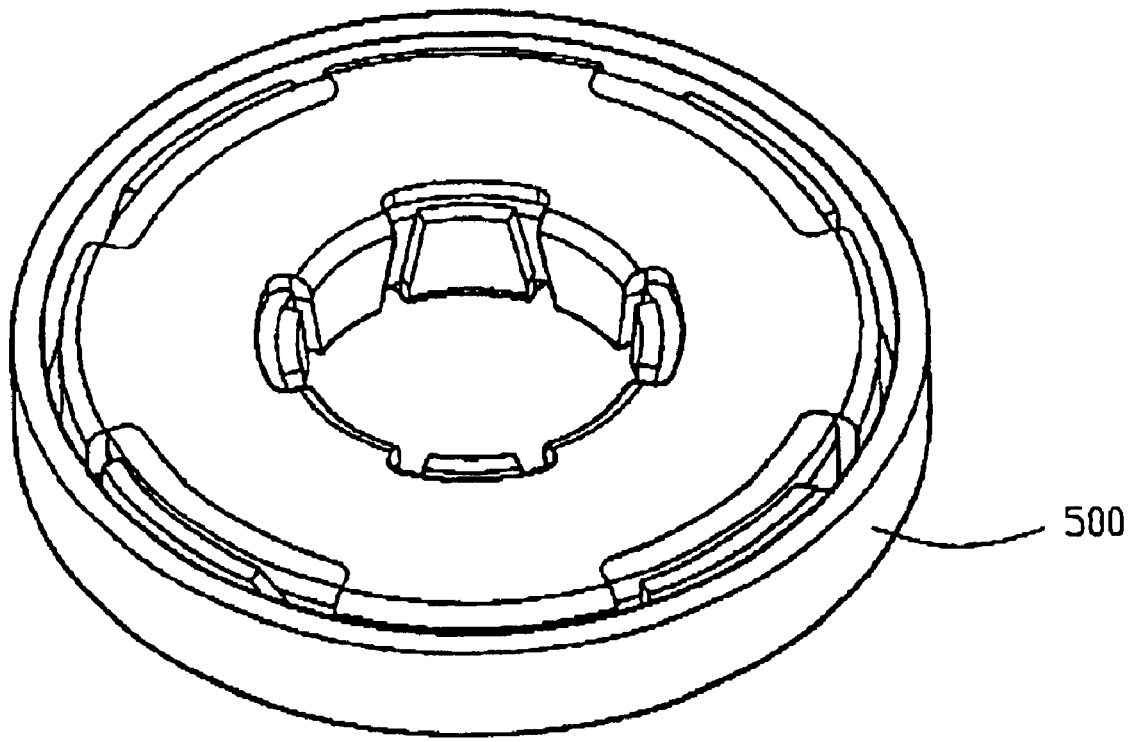

Referring to FIG. 2(*a*), the first coil seat 100 includes a first bottom plate 110, a plurality of first outer teeth 120 and a plurality of first inner teeth 130. The first bottom plate 110 further includes a first central opening 150. The first outer teeth 120 protrude form the first bottom plate 110 and surround the outer periphery of the first bottom plate 110. The first inner teeth 130 protrude form the first bottom plate 110 and surround the first central opening 150. Further, the coil 300 is positioned in the first coil seat 100.

Still referring to FIG. 2(*a*), the second coil seat 200 includes a second bottom plate 210, a plurality of second outer teeth 220 and a plurality of second inner teeth 230. The second bottom plate 210 further includes a second central opening 250. The second outer teeth 220 protrude form the second bottom plate 210 and surround the outer periphery of the second bottom plate 210. The second inner teeth 230 protrude form the second bottom plate 210 and surround the second central opening 250.

Still referring to FIG. 2(*a*), the second bottom plate 210 of the second coil seat 200 is formed above the coil 300 and the first coil seat 100. Besides, each of the second outer teeth 220 is interposed between the adjacent first outer teeth 120. Each of the second inner teeth 230 is interposed between the adjacent first inner teeth 130 (i.e. the first inner intervals 160 and the second inner intervals 260). In this manner, the first coil seat 100 and the second coil seat 200 define a space accommodating the coil 300. In addition, the first inner teeth 130 and the second inner teeth 230 form a post for winding the coil. By means of the first inner teeth 130 and the second inner teeth 230, the first coil seat 100 and the second coil seat 200 are coupled to each other. In the preferred embodiment, both of the first coil seat 100 and the second coil seat 200 are made of silicon steel. However, other magnetic conduction material, such as nickel steel, is applicable to the first coil seat 100 and the second coil seat 200. The coil 300 may be preformed coil. Alternatively, the coil 300 may be the coil wound around the post. Of course, the coil 300 has insulating surface so as to electrically isolate the first coil seat 100 and the second coil seat 200.

Referring to FIG. 2(*a*)–FIG. 2(*c*), the first coil seat 100, the second coil seat 200 and the coil 300 shown in FIG. 2(*a*) construct the stator 260 of the present invention. Referring to FIG. 2(*a*), note that the first coil seat 100 and the second coil seat 200 may be identical to each other. That is, the stator 260 may be composed of a first coil seat 100, an upside-down first coil seat 100 and a coil 300. However, the first coil seat 100 may be different from the second coil seat 200. Besides, the first coil seat 100 and the second coil seat 200 are made of sheet metal.

Additionally, as shown in FIG. 2(*b*) and FIG. 2(*c*), the present invention further includes a circular magnet 500, a metal housing 600 and a shaft (not shown). Among these, the circular magnet 500 surrounds the stator 260 and serves as the rotor of motor according to the present invention. The metal housing 600 surrounds the circular magnet 500 and used to avoid magnetic leakage. The FIG. 2(*c*) illustrates the resulting structure after the stator 260 couples to the circular magnet 500.

Figure 4:
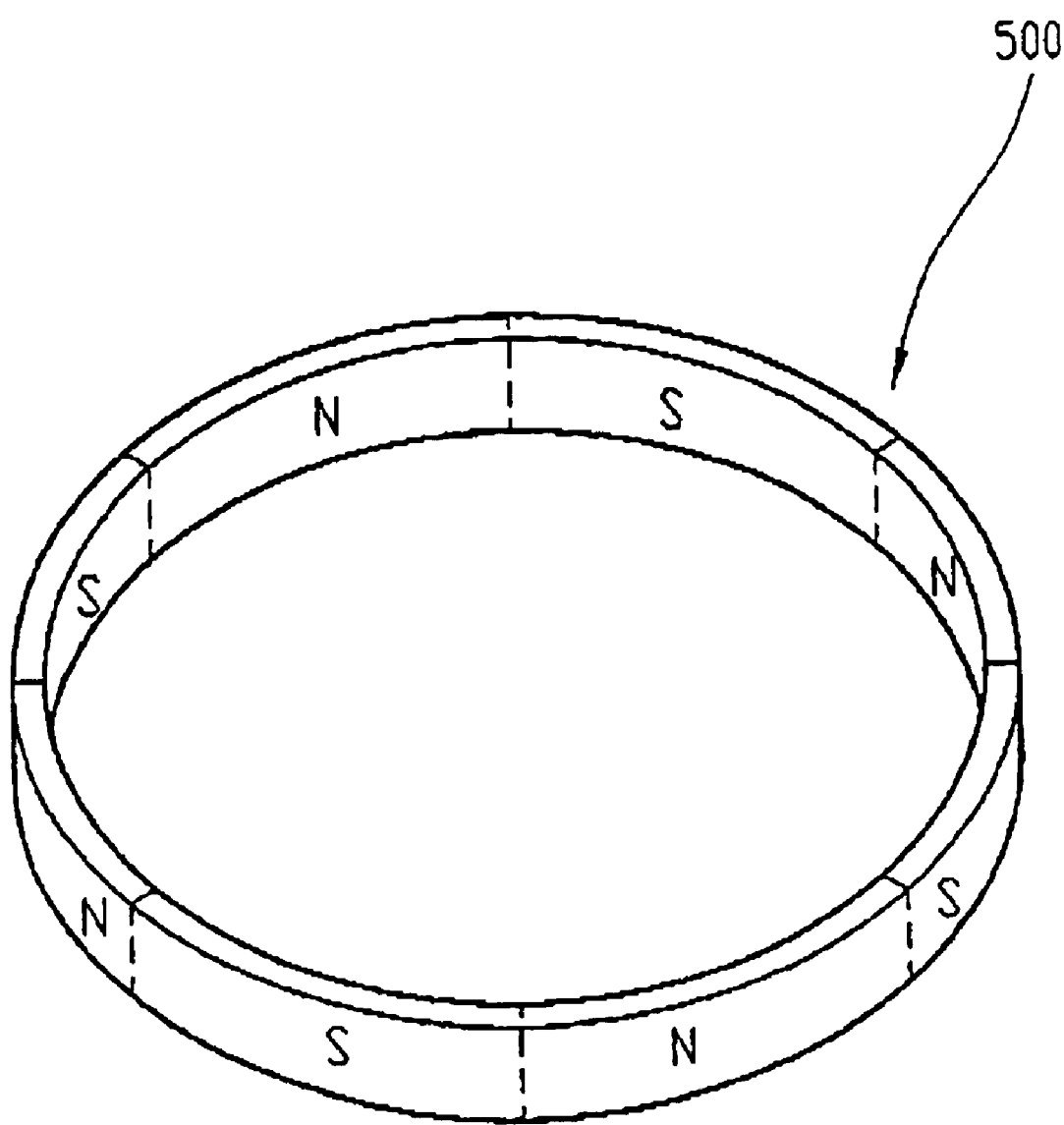
FIG. 4 depicts the magnetization of the circular magnet according to one preferred embodiment of the present invention.

As shown in FIG. 4 illustrating the preferred embodiment of magnetization of the circular magnet 500, there are even-numbered magnetic sections. Besides, the polarities of the adjacent magnetic sections are opposite to each other.

The present miniature motor is applicable to a fan structure. As shown in FIG. 3 illustrating the exploded view of the embodiment, the frame 700 having the board 800 formed thereon is provided. Then, the stator 260 consisting of the first coil seat 100, the second coil seat 200 and the coil 300 is directly mounted on the sleeve 710 over the board 800. After that, the circular magnet 500 and the metal housing 600 are sequentially formed on the stator 260. Finally, the shaft 910 couples the stator 260 to the blade structure 900.

Figure 5A:
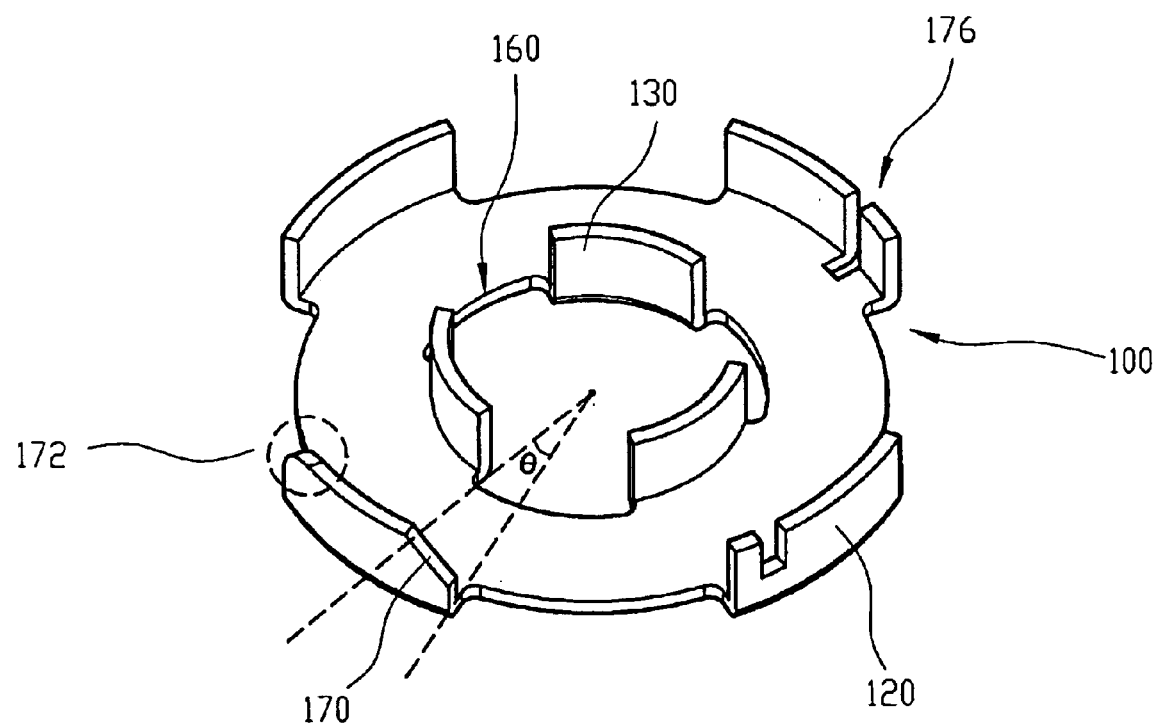
FIGS. 5*a*–5*b* depict two preferred embodiments according to the present invention.
Figure 5B:
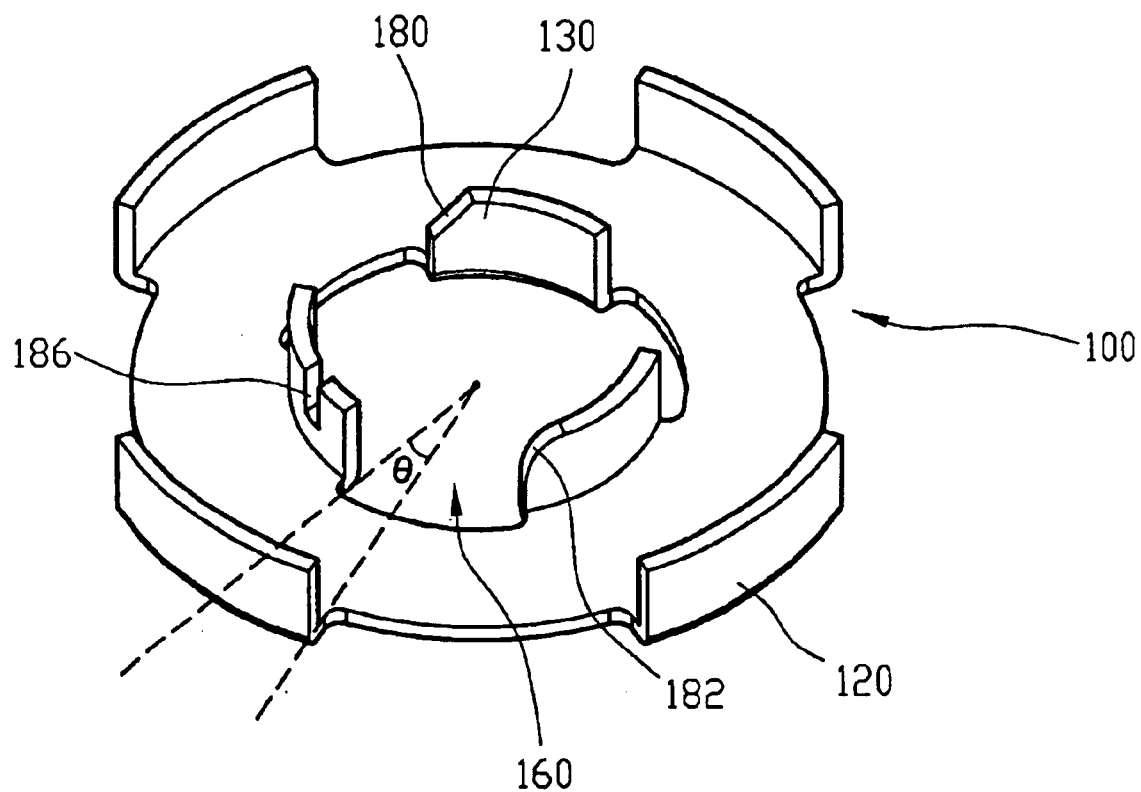

Two preferred embodiments of the present invention are shown in FIGS. 5*a*–5*b*. In the first coil seat or the second coil seat, the number of the outer teeth may be different from or the same with the number of the inner teeth. For example, the first coil seat 100 shown in FIGS. 5*a*–5*b* includes four first outer teeth 120 and three first inner teeth 130. In the first coil seat 100 shown in FIG. 2(*a*), the number of the first outer teeth 120 is the same with the number of the first inner teeth 130. Besides, in order to advantageously adjust the angle of magnetic inclination to start the motor, the inner teeth or the outer teeth optionally includes a cut corner 170,180 an arc 172,182 and a gap 176,186 extending from the outer teeth to the bottom plate. Furthermore, each first outer tooth 120 is arranged to partially exceed, with a predetermined angle θ for example, each corresponding first inner tooth 130 in the circumferential direction, but not radially adjacent to each inner tooth 130 as shown in FIGS. 5*a* and 5*b*.

Figure 1:
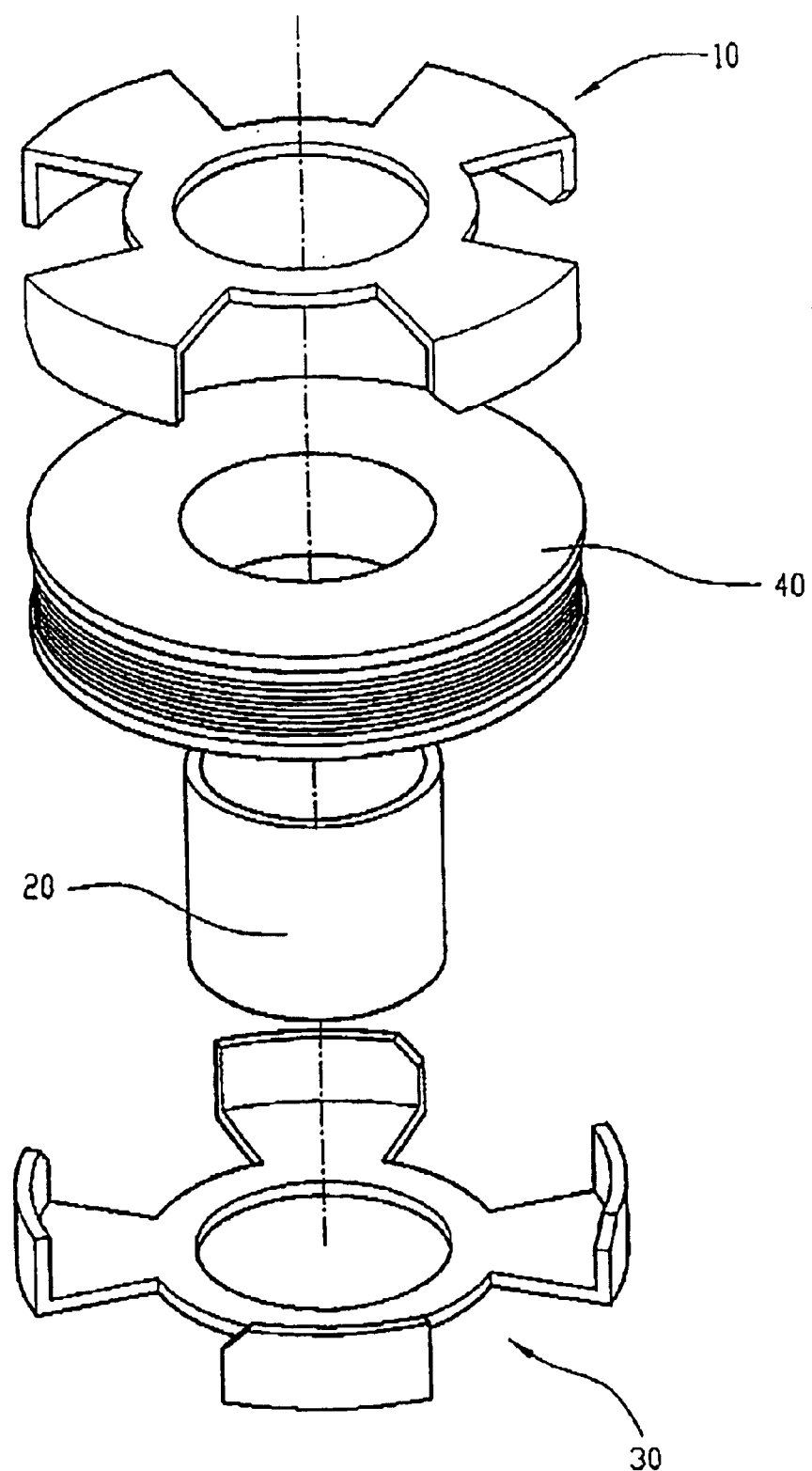
FIG. 1 depicts the stator of an conventional miniature motor

According to the present invention, the first coil seat and the second coil seat are coupled to each other by interlaced teeth so that the prior bearing tube, such as the element 20 shown in FIG. 1, can be omitted. Therfore, the present invention simplifies the manufacturing process and thus reduces cost.

As is understood by a person skilled in the art, the foregoing preferred embodiments of the present invention are illustrated of the present invention rather than limiting of the present invention. It is intended to cover various modifications and similar arrangements included within the spirit and scope of the appended claims, the scope of which should be accorded the broadest interpretation so as to encompass all such modifications and similar structure.

What is claimed is:

1. A miniature motor structure, comprising:
   a base with a sleeve;
   a stator disposed around the sleeve and further comprising:
   a first coil seat, including a first bottom plate, a plurality of first outer teeth, a plurality of first inner teeth;
   a coil, formed in the first coil seat;
   a second coil seat, including a second bottom plate, a plurality of second outer teeth, a plurality of second inner teeth, said second coil seat disposed on the first coil seat, each of said second outer teeth interposed between said adjacent first outer teeth, each of said second inner teeth interposed between said adjacent first inner teeth with the tops of the second inner teeth extending to the same plane of the first bottom plate and the tops of the first inner teeth extending to the same plane of the second bottom plate; and
   a circular magnet, surrounding said stator.

2. The miniature motor structure according to claim 1, wherein said first bottom plate further includes a first central opening, said first outer teeth protruding from said first bottom plate and surrounding an outer periphery of said first bottom plate, said first inner teeth protruding from said first bottom plate and surrounding said first central opening.

3. The miniature motor structure according to claim 1, wherein said second bottom plate further includes a second central opening, said second outer teeth protruding from said second bottom plate and surrounding an outer periphery of said second bottom plate, said second inner teeth protruding from said second bottom plate and surrounding said second central opening.

4. The miniature motor structure according to claim 1, further comprises a metal housing surrounding said circular magnet and used to avoid magnetic leakage.

5. The miniature motor structure according to claim 1, wherein said first coil seat and said second coil seat are made of silicon steel.

6. The miniature motor structure according to claim 1, wherein said coil is positioned in a space defined by said first coil seat and said second coil seat.

7. The miniature motor structure according to claim 1, wherein said coil is preformed.

8. The miniature motor structure according to claim 1, wherein said first coil seat and said second coil seat are assembled with said coil wound around said first coil seat and said second coil seat.

9. The miniature motor structure according to claim 1, wherein said first outer teeth and said second outer teeth, or said first inner teeth and said second inner teeth further comprise a cut corner.

10. The miniature motor structure according to claim 1, wherein said first outer teeth and said second outer teeth, or said first inner teeth and said second inner teeth further comprise an arc.

11. The miniature motor structure according to claim 1, wherein said first outer teeth and said second outer teeth, or said first inner teeth and said second inner teeth further comprise a gap.

12. The miniature motor structure according to claim 1, wherein said first outer teeth and said second outer teeth, or said first inner teeth and said second inner teeth further comprise an arc.

13. The miniature motor structure according to claim 1, wherein said first outer teeth and said second outer teeth, or said first inner teeth and said second inner teeth further comprise a gap.

14. A miniature motor structure, comprising:
a base with a sleeve;
a stator disposed around the sleeve and further comprising;
a first coil seat, including a first bottom plate, a plurality of first outer teeth, a plurality of first inner teeth, said first bottom plate further including a first central opening, said first outer teeth protruding from said first bottom plate and surrounding an outer periphery of said first bottom plate, said first inner teeth protruding from said first bottom plate and surrounding said first central opening;
a coil, formed in the first coil seat;
a second coil seat, including a second bottom plate, a plurality of second outer teeth, a plurality of second inner teeth, said second coil seat disposed on the first coil seat, said second bottom plate further including a second central opening, said second outer teeth protruding from said second bottom plate and surrounding an outer periphery of said second bottom plate, said second inner teeth protruding from said second bottom plate and surrounding said second central opening, each of said second outer teeth interposed between said adjacent first outer teeth, each of said second inner teeth interposed between said adjacent first inner teeth with the tops of the second inner teeth extending to the same plane of the first bottom plate and the tops of the first inner teeth extending to the same plane of the second bottom plate;
a circular magnet, surrounding said stator; and
a metal housing, surrounding said circular magnet.

15. The miniature motor structure according to claim 14, wherein said first coil seat is identical to said second coil seat.

16. The miniature motor structure according to claim 14, wherein said first coil seat and said second coil seat are made of silicon steel.

17. The miniature motor structure according to claim 14, wherein said coil is positioned in a space defined by said first coil seat and said second coil seat.

18. The miniature motor structure according to claim 14, wherein said coil is preformed.

19. The miniature motor structure according to claim 14, wherein said first coil seat and said second coil seat are assembled with said coil wound around said first coil seat and said second coil seat.

20. The miniature motor structure according to claim 14, wherein said first outer teeth and said second outer teeth, or said first inner teeth and said second inner teeth further comprise a cut corner.

21. A miniature motor structure, comprising:
a stator, further comprising:
a first coil seat, including a first bottom plate, a plurality of first outer teeth, a plurality of first inner teeth, wherein said first inner teeth and said first outer teeth are alternately arranged;
a coil, formed in the first coil seat;
a second coil seat, including a second bottom plate, a plurality of second outer teeth, a plurality of second inner teeth, wherein said second inner teeth and said second outer teeth are alternately arranged, said second coil seat disposed on the first coil seat, each of said second outer teeth interposed between said adjacent first outer teeth, each of said second inner teeth interposed between said adjacent first inner teeth;
a circular magnet, surrounding said stator; and
a shaft, passing through said stator.

22. The miniature motor structure according to claim 21, wherein said first bottom plate further includes a first central opening, said first outer teeth protruding from said first bottom plate and surrounding an outer periphery of said first bottom plate, said first inner teeth protruding from said first bottom plate and surrounding said first central opening, and said second bottom plate further includes a second central opening, said second outer teeth protruding from said second bottom plate and surrounding an outer periphery of said second bottom plate, said second inner teeth protruding from said second bottom plate and surrounding said second central opening.

23. The miniature motor structure according to claim 21, wherein said first outer teeth and said second outer teeth, or said first outer teeth and said second outer teeth further comprise a cut corner, an arc or a gap.

24. A miniature motor structure, comprising:
a stator, further comprising:
a first coil seat, including a first bottom plate, a plurality of first outer teeth, a plurality of first inner teeth, wherein each first outer tooth is arranged to partially exceed each corresponding first inner tooth in the circumferential direction;
a coil, formed in the first coil seat;
a second coil seat, including a second bottom plate, a plurality of second outer teeth, a plurality of second inner teeth, wherein each second outer tooth is arranged to partially exceed each corresponding second inner tooth in the circumferential direction, said second coil seat disposed on the first coil seat, each of said second outer teeth interposed between said adjacent first outer teeth, each of said second inner teeth interposed between said adjacent first inner teeth;
a circular magnet, surrounding said stator; and
a shaft, passing through said stator.

* * * * *